(12) United States Patent
Atungsiri et al.

(10) Patent No.: US 12,294,446 B2
(45) Date of Patent: May 6, 2025

(54) METHODS, INFRASTRUCTURE EQUIPMENT, AND COMMUNICATIONS DEVICES

(71) Applicant: Sony Group Corporation, Tokyo (JP)

(72) Inventors: Samuel Asangbeng Atungsiri, Basingstoke (GB); Vivek Sharma, Basingstoke (GB)

(73) Assignee: SONY GROUP CORPORATION, Tokyo (JP)

( * ) Notice: Subject to any disclaimer, the term of this patent is extended or adjusted under 35 U.S.C. 154(b) by 342 days.

(21) Appl. No.: 17/797,110

(22) PCT Filed: Feb. 19, 2021

(86) PCT No.: PCT/EP2021/054171
§ 371 (c)(1),
(2) Date: Aug. 3, 2022

(87) PCT Pub. No.: WO2021/170503
PCT Pub. Date: Sep. 2, 2021

(65) Prior Publication Data
US 2022/0376779 A1  Nov. 24, 2022

(30) Foreign Application Priority Data
Feb. 24, 2020 (EP) .................................. 20159136

(51) Int. Cl.
*H04B 7/185* (2006.01)
*H04B 7/204* (2006.01)
(Continued)

(52) U.S. Cl.
CPC ....... *H04B 7/2041* (2013.01); *H04B 7/18504* (2013.01); *H04B 7/1851* (2013.01);
(Continued)

(58) Field of Classification Search
None
See application file for complete search history.

(56) References Cited

U.S. PATENT DOCUMENTS 6,553,225 B1 * 4/2003 Zhao ................... H04B 7/2041
455/430
7,171,158 B2 * 1/2007 Rosen ................. H04B 7/1851
701/13
(Continued)

FOREIGN PATENT DOCUMENTS
EP  0658014 A1  6/1995

OTHER PUBLICATIONS

International Search Report and Written Opinion mailed on Jun. 2, 2021, received for PCT Application PCT/EP2021/054171, filed on Feb. 19, 2021, 19 pages.
(Continued)

*Primary Examiner* — Tuan A Tran
(74) *Attorney, Agent, or Firm* — XSENSUS LLP

(57) ABSTRACT

A method for operating an infrastructure equipment forming part of a non-terrestrial network, NTN, of a wireless communications network is provided. The method comprises transmitting a plurality of spot beams, each of the spot beams providing a wireless access interface for transmitting signals to and/or receiving signals from communications devices within a coverage region formed by the each of the spot beams, determining, for one or more of the spot beams, that the coverage region formed by the one or more of the spot beams is at least partially located within a geographical region in which NTN services are not permitted, and changing a utilisation state of each of the one or more of the spot beams from a first utilisation state to a second utilisation state.

20 Claims, 5 Drawing Sheets

(51) Int. Cl.
  *H04W 52/02* (2009.01)
  *H04W 74/08* (2024.01)
  *H04W 74/0833* (2024.01)

(52) U.S. Cl.
  CPC ..... *H04W 52/0229* (2013.01); *H04W 52/028* (2013.01); *H04W 74/0833* (2013.01)

(56) References Cited

U.S. PATENT DOCUMENTS

| | | | | |
|---|---|---|---|---|
| 9,585,150 | B2* | 2/2017 | Marsh | H04B 7/18539 |
| 9,748,989 | B1* | 8/2017 | Freedman | H04B 1/12 |
| 9,985,706 | B1* | 5/2018 | Freedman | H04B 7/1851 |
| 10,856,209 | B2* | 12/2020 | Kumar | H04B 7/18558 |
| 10,924,977 | B2* | 2/2021 | Kumar | H04B 7/18565 |
| 11,139,885 | B2* | 10/2021 | Boukari | H05K 9/0092 |
| 11,374,650 | B2* | 6/2022 | Buer | H04B 7/18517 |
| 12,040,881 | B2* | 7/2024 | Buer | H04B 7/18517 |
| 2018/0262266 | A1* | 9/2018 | Ravishankar | H04W 48/04 |
| 2018/0323863 | A1* | 11/2018 | Bournes | H04B 10/118 |
| 2020/0059295 | A1* | 2/2020 | Kumar | H04W 48/04 |

OTHER PUBLICATIONS

QUALCOMM Incorporated et al., "Satellite Cell Solution for Mobility and Regulatory Support for Satellite Access in 5G", SA WG2 Meeting #136, S2-1912043, Nov. 18-22, 2019, pp. 1-13.

LG Electronics Inc., "Remaining issues of tracking area management in NTN", 3GPP TSG RAN WG2 Meeting #107bis, R2-1913348, Oct. 14-18, 2019, 3 pages.

Nokia et al., "Mobility Restrictions in super-national cell coverage area", SA WG2 Meeting #136, S2-1911514, Nov. 18-22, 2019, pp. 1-4.

3GPP, "Study on New Radio (NR) to support non-terrestrial networks (Release 15)", 3GPP TR 38.811 V15.2.0, Sep. 2019, pp. 1-126.

Holma et al., "LTE for UMTS OFDMA and SC-FDMA Based Radio Access", John Wiley & Sons, 2009, 232 pages.

NTT DOCOMO, Inc., "Revised WID on New Radio Access Technology", 3GPP TSG RAN Meeting #78, RP-172834, Dec. 18-21, 2017, 11 pages.

3GPP, "Study on Scenarios and Requirements for Next Generation Access Technologies; (Release 15)", 3GPP TR 38.913 V15.0.0, Jun. 2018, pp. 1-39.

* cited by examiner

METHODS, INFRASTRUCTURE EQUIPMENT, AND COMMUNICATIONS DEVICES

CROSS-REFERENCE TO RELATED APPLICATIONS

The present application is based on PCT filing PCT/EP2021/054171, filed Feb. 19, 2021, which claims priority to EP 20159136.9, filed Feb. 24, 2020, the entire contents of each are incorporated herein by reference.

BACKGROUND

The present disclosure relates generally to Non-Terrestrial Networks, NTNs, and specifically to methods of operating infrastructure equipment forming part of NTNs in geographical regions within which NTN services are not permitted.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes so-called "non-terrestrial networks", or NTN for short. 3GPP has proposed in Release 15 of the 3GPP specifications to develop technologies for providing coverage by means of one or more antennas mounted on airborne or space-borne vehicles W.

Non-terrestrial networks may provide service in areas that cannot be covered by terrestrial cellular networks (i.e. those where coverage is provided by means of land-based antennas), such as isolated or remote areas, on board aircraft or vessels) or may provide enhanced service in other areas. The expanded coverage that may be achieved by means of non-terrestrial networks may provide service continuity for machine-to-machine (M2M) or 'internet of things' (IoT) devices, or for passengers on board moving platforms (e.g. passenger vehicles such as aircraft, ships, high speed trains, or buses). Other benefits may arise from the use of non-terrestrial networks for providing multicast/broadcast resources for data delivery.

The use of different types of network infrastructure equipment and requirements for coverage enhancement give rise to new challenges for efficiently handling communications in wireless communications systems that need to be addressed.

SUMMARY OF THE DISCLOSURE

The present disclosure can help address or mitigate at least some of the issues discussed above.

Embodiments of the present technique can provide a method for operating an infrastructure equipment forming part of a non-terrestrial network, NTN, of a wireless communications network. The method comprises transmitting a plurality of spot beams, each of the spot beams providing a wireless access interface for transmitting signals to and/or receiving signals from communications devices within a coverage region formed by the each of the spot beams, determining, for one or more of the spot beams, that the coverage region formed by the one or more of the spot beams is at least partially located within a geographical region in which NTN services are not permitted, and changing a utilisation state of each of the one or more of the spot beams from a first utilisation state to a second utilisation state.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Evolution Advanced Radio Access Technology (4G)

Figure 1:
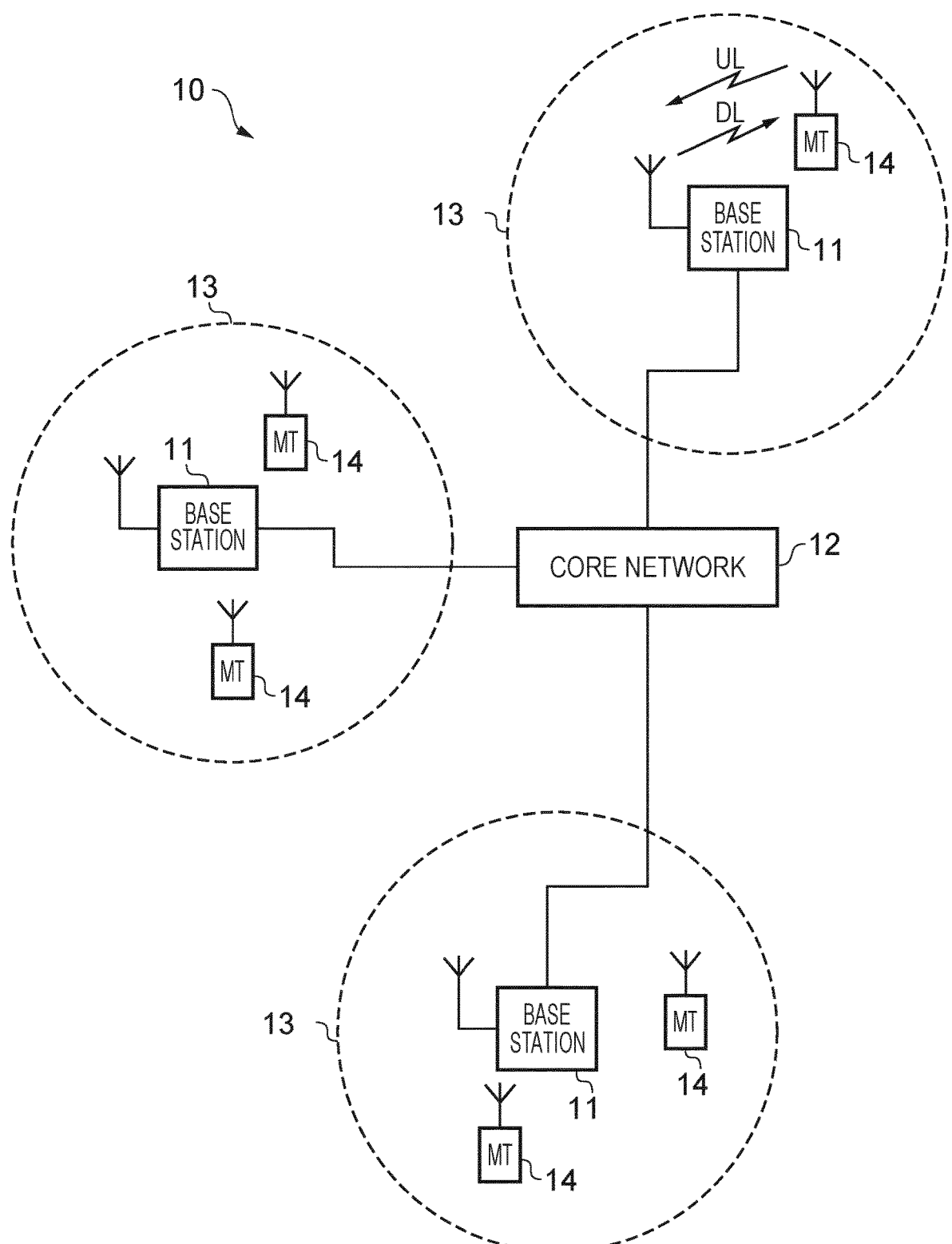
FIG. 1 schematically represents some aspects of an LTE-type wireless telecommunication system which may be configured to operate in accordance with certain embodiments of the present disclosure.

FIG. 1 provides a schematic diagram illustrating some basic functionality of a mobile telecommunications network/system 10 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [2]. It will be appreciated that operational aspects of the telecommunications (or simply, communications) networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 10 includes a plurality of base stations 11 connected to a core network 12. Each base station provides a coverage area 13 (i.e. a cell) within which data can be communicated to and from terminal devices 14. Data is transmitted from base stations 11 to terminal devices 14 within their respective coverage areas 13 via a radio downlink (DL). Data is transmitted from terminal devices 14 to the base stations 11 via a radio uplink (UL). The core network 12 routes data to and from the terminal devices 14 via the respective base stations 11 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs/eNBs/g-nodeBs/gNBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

As mentioned above, the embodiments of the present disclosure can also find application with advanced wireless communications systems such as those referred to as 5G or New Radio (NR) Access Technology. The use cases that are considered for NR include:

Enhanced Mobile Broadband (eMBB)
Massive Machine Type Communications (mMTC)
Ultra Reliable & Low Latency Communications (URLLC) [3]

eMBB services are characterised by high capacity with a requirement to support up to 20 Gb/s. The requirement for URLLC is a reliability of $1-10^{-5}$ (99.999%) for one transmission of a relatively short packet, for example a 32 byte packet with a user plane latency of 1 ms [4].

The elements of the wireless access network shown in FIG. 1 may be equally applied to a 5G new RAT configuration, except that a change in terminology may be applied as mentioned above.

Figure 2:
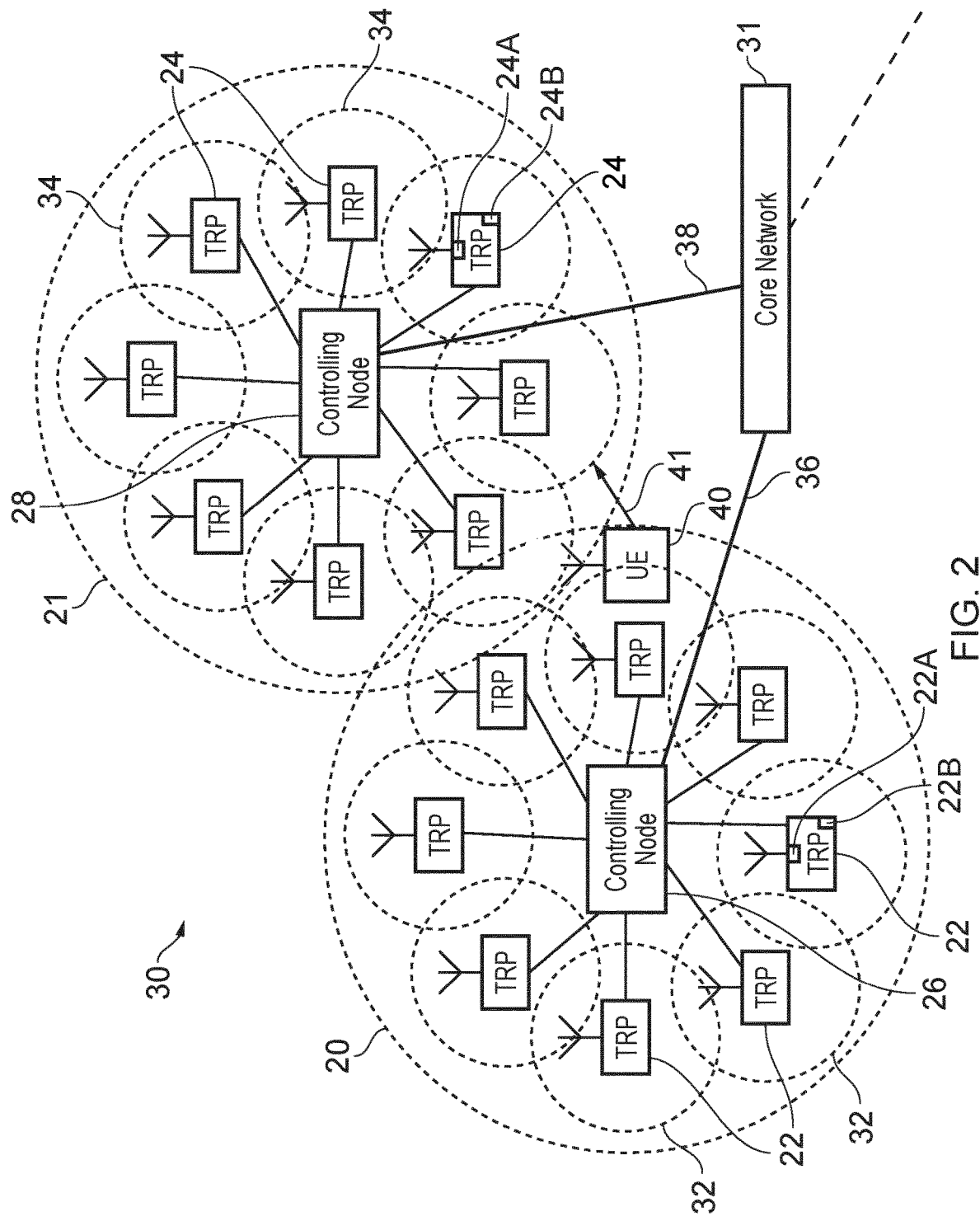
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 30 based on previously proposed approaches which may also be adapted to provide functionality in accordance with embodiments of the disclosure described herein. The new RAT network 30 represented in FIG. 2 comprises a first communication cell 20 and a second communication cell 21. Each communication cell 20, 21, comprises a controlling node (centralised unit) 26, 28 in communication with a core network component 31 over a respective wired or wireless link 36, 38. The respective controlling nodes 26, 28 are also each in communication with a plurality of distributed units (radio access nodes/remote transmission and reception points (TRPs)) 22, 24 in their respective cells. Again, these communications may be over respective wired or wireless links. The distributed units 22, 24 are responsible for providing the radio access interface for terminal devices connected to the network. Each distributed unit 22, 24 has a coverage area (radio access footprint) 32, 34 which together define the coverage of the respective communication cells 20, 21. Each distributed unit 22, 24 includes transceiver circuitry 22*a*, 24*a* for transmission and reception of wireless signals and processor circuitry 22*b*, 24*b* configured to control the respective distributed units 22, 24.

In terms of broad top-level functionality, the core network component 31 of the new RAT telecommunications system represented in FIG. 2 may be broadly considered to correspond with the core network 12 represented in FIG. 1, and the respective controlling nodes 26, 28 and their associated distributed units/TRPs 22, 24 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/ TRPs.

A terminal device 40 is represented in FIG. 2 within the coverage area of the first communication cell 20. This terminal device 40 may thus exchange signalling with the first controlling node 26 in the first communication cell via one of the distributed units 22 associated with the first communication cell 20. In some cases communications for a given terminal device are routed through only one of the distributed units, but it will be appreciated in some other implementations communications associated with a given terminal device may be routed through more than one distributed unit, for example in a soft handover scenario and other scenarios.

The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 26 is responsible for determining which of the distributed units 22 spanning the first communication cell 20 is responsible for radio communications with the terminal device 40 at any given time (i.e. which of the distributed units are currently active distributed units for the terminal device). Typically this will be based on measurements of radio channel conditions between the terminal device 40 and respective ones of the distributed units 22. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 40. That is to say, in some cases the terminal device may not be aware of which distributed unit is responsible for routing communications between the terminal device 40 and the controlling node 26 of the communication cell 20 in which the terminal device is currently operating, or even if any distributed units 22 are connected to the controlling node 26 and involved in the routing of communications at all. In such cases, as far as the terminal device is concerned, it simply transmits uplink data to the controlling node 26 and receives downlink data from the controlling node 26 and the terminal device has no awareness of the involvement of the distributed units 22, though may be aware of radio configurations transmitted by distributed units 22. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 20, 21 and one terminal device 40 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2.

It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 11 as shown in FIG. 1 which is adapted to provide functionality in accordance with the principles described herein, and in other examples the network infrastructure equipment may comprise a control unit/controlling node 26, 28 and/or a TRP 22, 24 of the kind shown in FIG. 2 which is adapted to provide functionality in accordance with the principles described herein.

Non-Terrestrial Networks (NTNs)

Figure 3:
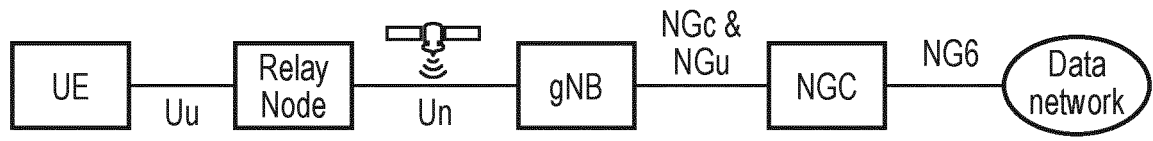
FIG. 3 is reproduced from [1], and illustrates a first example of an NTN featuring an access networking service relay node and based on a satellite/aerial with a bent pipe payload.
Figure 4:
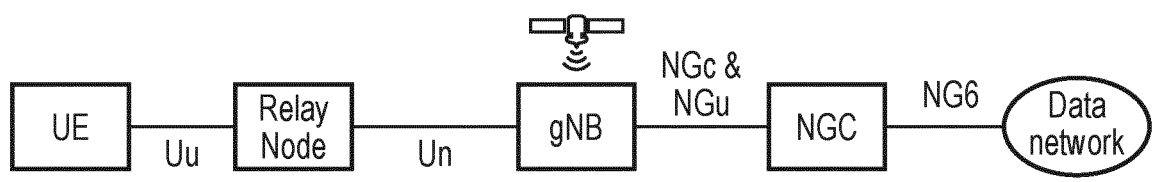
FIG. 4 is reproduced from [1], and illustrates a second example of an NTN featuring an access networking service relay node and based on a satellite/aerial connected to a gNodeB.

An overview of NR-NTN can be found in [1], and much of the following wording, along with FIGS. 3 and 4, has been reproduced from that document as a way of background.

As a result of the wide service coverage capabilities and reduced vulnerability of space/airborne vehicles to physical attacks and natural disasters, Non-Terrestrial Networks are expected to:

foster the roll out of 5G service in un-served areas that cannot be covered by terrestrial 5G network (isolated/remote areas, on board aircrafts or vessels) and under-served areas (e.g. sub-urban/rural areas) to upgrade the performance of limited terrestrial networks in cost effective manner;

reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications; and to enable 5G network scalability by providing efficient multicast/broadcast resources for data delivery towards the network edges or even user terminal.

The benefits relate to either Non-Terrestrial Networks operating alone or to integrated terrestrial and Non-Terrestrial networks. They will impact at least coverage, user bandwidth, system capacity, service reliability or service availability, energy consumption and connection density. A role for Non-Terrestrial Network components in the 5G system is expected for at least the following verticals: transport, Public Safety, Media and Entertainment, eHealth, Energy, Agriculture, Finance and Automotive.

FIG. 3 illustrates a first example of an NTN featuring an access networking service relay nodes and based on a satellite/aerial with a bent pipe payload, meaning that the same data is sent back down to Earth as is received by the satellite/aerial, with only frequency or amplification changing; i.e. acting like a pipe with a u-bend. In this example NTN, the satellite or the aerial will therefore relay a "satellite friendly" NR signal between the gNodeB and the relay nodes in a transparent manner FIG. 4 illustrates a second example of an NTN featuring an access networking service relay node and based on a satellite/aerial comprising a gNodeB. In this example NTN, the satellite or aerial embarks full or part of a gNodeB to generate or receive a "satellite friendly" NR signal to/form the relay nodes. This requires sufficient on-board processing capabilities to be able to include a gNodeB or relay node functionality.

Relay node (RN) related use cases such as those shown in FIGS. 3 and 4 will play an important role in the commercial deployment of NTN; i.e. relay nodes mounted on high speed trains, relay nodes mounted in cruise ships, relay nodes at home/office and relay nodes mounted on airliners. It should be well understood by those skilled in the art that the proposed solutions of embodiments of the present technique could be equally applied to conventional UEs and RNs.

Figure 5:
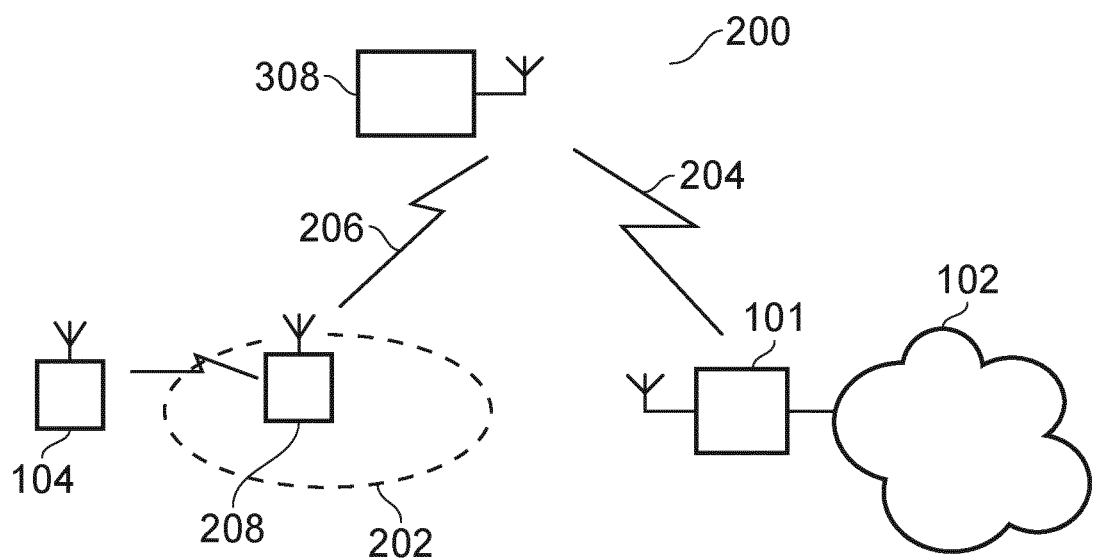
FIG. 5 schematically shows an example of a wireless communications system which may be configured to operate in accordance with embodiments of the present disclosure.

FIG. 5 schematically shows an example of a wireless communications system 200 which may be configured to operate in accordance with embodiments of the present disclosure. The wireless communications system 200 in this example is based broadly around an LTE-type or 5G-type architecture. Many aspects of the operation of the wireless communications system/network 200 are known and understood and are not described here in detail in the interest of brevity. Operational aspects of the wireless communications system 200 which are not specifically described herein may be implemented in accordance with any known techniques, for example according to the current LTE-standards or the proposed 5G standards.

The wireless communications system 200 comprises a core network part 102 (which may be a 4G core network or a 5G core network) in communicative connection with a radio network part. The radio network part comprises a base station (g-node B) 101 connected to a non-terrestrial network part 308. The non-terrestrial network part 308 may be an example of infrastructure equipment. Alternatively, or in addition, the non-terrestrial network part 308 may be mounted on a satellite vehicle or on an airborne vehicle.

The non-terrestrial network part 308 may communicate with a communications device 208, located within a cell 202, by means of a wireless access interface provided by a wireless communications link 206. For example, the cell 202 may correspond to the coverage area of a spot beam generated by the non-terrestrial network part 308. The boundary of the cell 202 may depend on an altitude of the non-terrestrial network part 308 and a configuration of one or more antennas of the non-terrestrial network part 308 by which the non-terrestrial network part 308 transmits and receives signals on the wireless access interface.

The non-terrestrial network part 308 may be a satellite in an orbit with respect to the Earth, or may be mounted on such a satellite. For example, the satellite may be in a geo-stationary earth orbit (GEO) such that the non-terrestrial network part 308 does not move with respect to a fixed point on the Earth's surface. The geo-stationary earth orbit may be approximately 36,786 km above the Earth's equator. The satellite may alternatively be in a low-earth orbit (LEO), in which the non-terrestrial network part 308 may complete an orbit of the Earth relatively quickly, thus providing moving cell coverage. Alternatively, the satellite may be in a non-geostationary orbit (NGSO), so that the non-terrestrial network part 308 moves with respect to a fixed point on the Earth's surface. The non-terrestrial network part 308 may be an airborne vehicle such as an aircraft, or may be mounted on such a vehicle. The airborne vehicle (and hence the non-terrestrial network part 308) may be stationary with respect to the surface of the Earth or may move with respect to the surface of the Earth.

In FIG. 5, the base station 101 is shown as ground-based, and connected to the non-terrestrial network part 308 by means of a wireless communications link 204. The non-terrestrial network part 308 receives signals representing downlink data transmitted by the base station 101 on the wireless communications link 204 and, based on the received signals, transmits signals representing the downlink data via the wireless communications link 206 providing the wireless access interface for the communications device 206. Similarly, the non-terrestrial network part 308 receives signals representing uplink data transmitted by the communications device 206 via the wireless access interface comprising the wireless communications link 206 and transmits signals representing the uplink data to the base station 101 on the wireless communications link 204. The wireless communications links 204, 206 may operate at a same frequency, or may operate at different frequencies.

The extent to which the non-terrestrial network part 308 processes the received signals may depend upon a processing capability of the non-terrestrial network part 308. For example, the non-terrestrial network part 308 may receive signals representing the downlink data on the wireless communication link 204, amplify them and (if needed) re-modulate onto an appropriate carrier frequency for onwards transmission on the wireless access interface provided by the wireless communications link 206. Alternatively, the non-terrestrial network part 308 may be configured to decode the signals representing the downlink data received on the wireless communication link 204 into unencoded downlink data, re-encode the downlink data and modulate the encoded downlink data onto the appropriate carrier frequency for onwards transmission on the wireless access interface provided by the wireless communications link 206.

The non-terrestrial network part 308 may be configured to perform some of the functionality conventionally carried out by the base station 101. In particular, latency-sensitive functionality (such as acknowledging a receipt of the uplink data, or responding to a RACH request) may be performed by the non-terrestrial network part 308 as the base station 101.

The base station 101 may be co-located with the non-terrestrial network part 308; for example, both may be mounted on the same satellite vehicle or airborne vehicle, and there may be a physical (e.g. wired, or fibre optic) connection on board the satellite vehicle or airborne vehicle, providing the coupling between the base station 101 and the non-terrestrial network part 308. In such co-located arrangements, a wireless communications feeder link between the base station 101 and a ground station (not shown) may provide connectivity between the base station 101 and the core network part 102.

The communications device 208 shown in FIG. 5 may be configured to act as a relay node. That is, it may provide connectivity to one or more terminal devices such as the terminal device 104. When acting as a relay node, the communications device 208 transmits and receives data to and from the terminal device 104, and relays it, via the non-terrestrial network part 308 to the base station 101. The communications device 208, acting as a relay node, may thus provide connectivity to the core network part 102 for terminal devices which are within a transmission range of the communications device 208.

It will be apparent to those skilled in the art that many scenarios can be envisaged in which the combination of the communications device 208 and the non-terrestrial network part 308 can provide enhanced service to end users. For example, the communications device 208 may be mounted on a passenger vehicle such as a bus or train which travels through rural areas where coverage by terrestrial base stations may be limited. Terminal devices on the vehicle may obtain service via the communications device 208 acting as a relay, which communicates with the non-terrestrial network part 308.

There is a need to ensure that connectivity for the communications device 208 with the base station 101 can be maintained, in light of the movement of the communications device 208, the movement of the non-terrestrial network part 308 (relative to the Earth's surface), or both. According to conventional cellular communications techniques, a decision to change a serving cell of the communications device 208 may be based on measurements of one or more characteristics of a radio frequency communications channel, such as signal strength measurements or signal quality measurements. In a terrestrial communications network, such measurements may effectively provide an indication that the communications device 208 is at, or approaching, an edge of a coverage region of a cell, since, for example, path loss may broadly correlate to a distance from a base station. However, such conventional measurement-based algorithms may be unsuitable for cells generated by means of the transmission of beams from a non-terrestrial network part, such as the cell 202 generated by the non-terrestrial network part 308. In particular, path loss may be primarily dependent on an altitude of the non-terrestrial network part 308 and may vary only to a very limited extent (if at all) at the surface of the Earth, within the coverage region of the cell 202. As a result, the strength of a received signal may be always lower than that from a terrestrial base station, which thus will always be selected when available.

A further disadvantage of conventional techniques may be the relatively high rate at which cell changes occur for the communications device 208 obtaining service from one or more non-terrestrial network parts. For example, where the non-terrestrial network part 308 is mounted on a satellite in a low-earth orbit (LEO), the non-terrestrial network part 308 may complete an orbit of the Earth in around 90 minutes; the coverage of a cell generated by the non-terrestrial network part 308 will move very rapidly, with respect to a fixed observation point on the surface of the Earth. Similarly, it may be expected that the communications device 208 may be mounted on an airborne vehicle itself, having a ground speed of several hundreds of kilometres per hour.

Satellite-based NTN systems typically have coverage that will span across national boundaries, because of the large footprint of the satellite beams. In traditional and known satellite communications, the satellite continues to transmit even when it is over territories in which its services are not needed. Often, the transmitted signals are encrypted and only authorised subscribers in territories where the services are licensed for operation may decrypt and consume the services. There is ongoing consideration for use of some traditional cellular frequencies for NTN RAN. Given the supra-national coverage capability of NTN systems, it is necessary to update operating regulations at the International Telecommunications Union Radiocommunication Sector (ITU-R) to define the prerogatives of national governments in the licensing and operation of NTN services within their national boundaries. Such prerogatives are likely to be influenced by whether the NTN system is operating in traditional mobile satellite services (MSS) frequency bands, or in traditional cellular frequency bands or indeed any frequency bands that are shared between satellite and any non-terrestrial communication services.

NTN systems must therefore be designed in a manner as to allow the flexibility necessary for national governments to exercise their prerogatives. For example, if a government chooses not to license NTN services for operation within its national boundaries, then NTN-capable UEs should not be allowed to access such services whilst within the said national boundaries in accordance with that government's regulations. If an NTN system Radio Access Network (RAN) uses traditional cellular or any other frequencies also used for terrestrial communications for access, then the NTN system RAN should not be allowed to transmit those frequencies when over-flying a nation which uses the same frequencies for terrestrial communications, so as to avoid impacting upon and interfering with these terrestrial cellular communications or other transmissions within that nation.

Embodiments of the present technique provide solutions to such problems, whilst ensuring that any negative impacts on the NTN systems and services themselves are reduced.

Marking Country-Wide Service Holes for NTN

Figure 6:
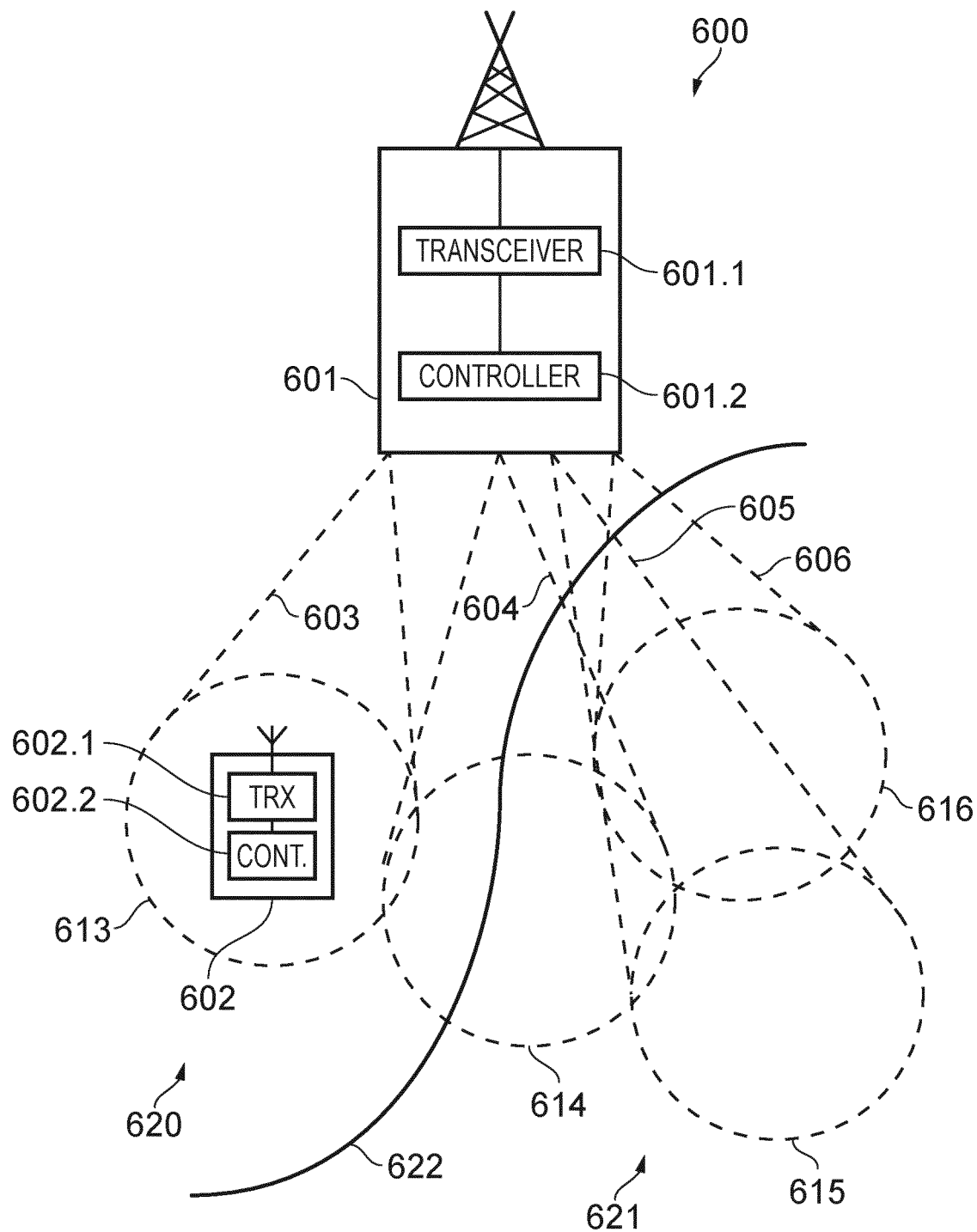
FIG. 6 shows schematic representation of a wireless communications network comprising an infrastructure equipment forming part of a non-terrestrial network, NTN, of the wireless communications network in accordance with embodiments of the present technique.

FIG. 6 shows schematic representation of a wireless communications network 600 comprising an infrastructure equipment 601 and a communications device 602 which is served by the infrastructure equipment 601 in accordance with embodiments of the present technique. The infrastructure equipment 601 may be a non-terrestrial network part (e.g. a satellite) configured to provide a plurality of spot beams 603, 604, 605, 606, each of the spot beams 603, 604, 605, 606 providing a wireless access interface for transmitting signals to and receiving signals representing data from at least the communications device 602 within a radio coverage region 613, 614, 615, 616 formed by each of the spot beams 603, 604, 605, 606. In the following description reference to a coverage area being formed by a spot beam provided by a non-terrestrial network infrastructure equipment should also be interpreted as being a cell as an alternative because each spot beam may have one or more cell identities, in which case there is cell selection/reselection.

The infrastructure equipment 601 and the communications device 602 each comprises one or more transceivers (or transceiver circuitry) 601.1, 602.1, and a controller (or controller circuitry) 601.2, 602.2. Each of the controllers 601.2, 602.2 may be, for example, a microprocessor, a CPU, or a dedicated chipset, etc. The transceivers (or transceiver circuitry) 601.1, 602.1 of one or each of the infrastructure equipment 601 and the communications device 602 may comprise both a transmitter and a receiver, or may—instead of being a transceiver—be a standalone transmitter and receiver pair. It would be appreciated by those skilled in the art that the infrastructure equipment 601 (as well as in some arrangements the communications device 602 and any other infrastructure equipment or communications devices operating in accordance with embodiments of the present technique) may comprise a plurality of (or at least, one or more) transceivers (or transceiver circuitry) 601.1, 602.1, which have a one-to-one relationship with the transmitted beams. That is, infrastructure equipment (such as infrastructure equipment 601) operating in accordance with embodiments of the present technique may comprise one or more (or a plurality of) transceivers which each provide one spot beam of the plurality of spot beams 603, 604, 605, 606.

Specifically, as is shown by FIG. 6, the transceiver circuitry 601.1 and the controller circuitry 601.2 of the infrastructure equipment 601 are configured in combination to determine, for one or more of the spot beams 603, 604, that the coverage region 613, 614 formed by the one or more of the spot beams 603, 604 is at least partially located within a geographical region 620 in which NTN services are not permitted, and to change a utilisation state of each of the one or more of the spot beams 603, 604 from a first utilisation state to a second utilisation state, to avoid providing services in the said geographical region. In the example of FIG. 6, geographical region 620 in which NTN services are not permitted is shown separated from a second geographical region 621 in which NTN services are permitted by a border 622.

Here, a utilisation state of a spot beam refers to how the spot beam is used; in active solutions (described in further detail below), the utilisation state may refer to how the beam is used; e.g. to provide full NTN services or to provide only NTN-related signalling information. Alternatively, in passive solutions (also described in further detail below), the utilisation state may refer to, among other examples, whether a beam is switched on or off.

Here, the communications device 602 is shown as being in the coverage region 613 of the spot beam 603 which is located at least partially within the geographical region 620 in which NTN services are not permitted. It will of course be appreciated that the communications device 602 could be in any of the coverage regions 613, 614, 615, 616 shown in FIG. 6 (or indeed in a different coverage region not shown) which may be in the geographical region 620 in which NTN services are not permitted, or a different geographical region in which NTN services may be permitted or may not be permitted. With respect to signalling information exchanged between the infrastructure equipment 601 and the communications device 602 regarding such NTN services being permitted or not for example, which is discussed below with respect to at least some arrangements of embodiments of the present technique, the communications device 602 could in some arrangements receive this signalling information regardless of whether it is in a region which permits NTN services or not; such signalling information is useful to a communications device 602 which may be mobile and moving between geographical regions, for example between one region in which NTN services are licensed and another where they are not.

In the example communications system shown in FIG. 6, and in accordance with embodiments of the present technique, the non-terrestrial infrastructure equipment 601 may be one of a satellite, an airborne vehicle or an airborne platform. In the example communications system shown in FIG. 6, and in accordance with embodiments of the present technique, the communications device 602 may be a user equipment, or alternatively (or in addition) may be acting as a relay node for one or more user equipment, each of the one or more user equipment being in one of a Radio Resource Control (RRC) connected state/mode, an RRC idle state or an RRC inactive state. Each of such RRC states are well known to those skilled in the art.

Essentially, embodiments of the present technique provide solutions to the problem of how to manage NTN satellites and base stations within countries or geographical regions in which NTN services are not permitted. Embodiments of the present technique may be considered as being broadly divided into two sets of solutions; active solutions and passive solutions. In active arrangements, the NTN network and NTN-capable UEs located in the territory or country where NTN services are not licensed may exchange signalling information from which the UE can discern that NTN services are either inoperative or not licensed. Since active solutions require the gNB/satellite and/or UEs to transmit some signals, such active solutions can only be deployed for NTN systems whose RAN uses MSS access frequency bands or any other frequencies that are not used for terrestrial communications within the said territories, otherwise terrestrial signals being communicated using those frequencies will suffer from interference from the NTN signalling information. In passive solutions however, neither the network nor the UEs are allowed to transmit within the said territory for fear of causing such interference. Such passive arrangements are the only solutions useable for NTN systems whose RAN uses traditional terrestrial cellular frequencies or any other frequencies that are or may be used for other terrestrial communications within the said territory.

Both the active arrangements and the passive arrangements provide solutions to the question: How does the network know when the satellite is overflying a territory where NTN is not licensed? For GEO satellites/infrastructure equipment, the network knows exactly where the footprint of each satellite beam is on earth and so knows whether a given beam covers a given country or not. In other words, for GEO infrastructure equipment (i.e. wherein a trajectory of the infrastructure equipment is such that the coverage area formed by each of the plurality of spot beams is substantially constant with respect to the surface of the Earth) the infrastructure equipment will always know—unless the policy in a particular region or country changes (in which case, knowledge of the network/infrastructure equipment can change too)—which of its spot beams cover regions/countries where NTN services are permitted and which of its spot beams cover regions/countries where they are not.

For NGSO satellites/infrastructure equipment however (i.e. wherein the coverage area formed by each of the plurality of spot beams varies over time in accordance with a motion of the infrastructure equipment with respect to the surface of the Earth), one solution to this question may be to utilise a database of vertices/contours of latitude and longitudes marking the boundaries of countries/territories in which NTN services are not licensed for operation which is collated and held within the network. In other words, the infrastructure equipment may be configured to access a database stored by the wireless communications network, the database comprising a list providing an indication of geographical regions (e.g. by indicating the longitudinal and latitudinal contours which define those geographical regions) in which NTN services are not permitted. This database may be stored at the infrastructure equipment itself, or may be stored at another point in the network, and accessed by the infrastructure equipment when needed. This database may be shared with UEs at sign on. In other words, the infrastructure equipment may be configured to transmit, to at least one communications device, signalling information providing an indication of at least a portion of the database. In some arrangements of embodiments of the present technique, when such sharing is required, since storage space and power at the UE may be limited, only the part of the database relevant to the region of the world in which the UE is located when it first signs on may be transmitted to the UE, in other to save both storage space and power at the UE. In some embodiments of the present technique, the database of vertices/contours of latitude and longitudes may be updated as necessary or periodically via additional system information for example.

Active Solutions

In at least some arrangements of embodiments of the present technique, the network divides the Earth's surface into Earth-fixed tracking areas (TAs). Each TA incorporates many cells. TAs can follow national boundary contours as much as possible. The network uses the ephemeris and orbital information of the NGSO satellite to calculate the satellite position and where its beams are falling on earth. For GEO satellites, the network knows where the beams are falling on earth. By comparing the location of the area illuminated by the satellite beams incorporating the cells with the stored database of vertices of latitude and longitudes marking the boundaries of countries with no NTN licensees, the network is able to know when the satellite beam is illuminating a territory and/or TA where NTN services are not licensed for operation. In other words, the infrastructure equipment is configured to identify a plurality of tracking areas located on the surface of the Earth, each of the tracking areas comprising one or more coverage regions each covered by one of the plurality of spot beams, to determine that one or more of the tracking areas is at least partially located within the geographical region in which NTN services are not permitted, and to change a utilisation state of each of the one or more of the spot beams that form a coverage area comprised within the one or more of the tracking areas from a first utilisation state to a second utilisation state.

In active arrangements of embodiments of the present technique, where NTN-related signalling information is still able to be transmitted using NTN frequencies to UEs within geographical regions in which NTN services are not available, the infrastructure equipment may exchange such signalling information with at least one communications device located within the coverage region of at least one of the spot beams illuminating the geographical region. In other words, if the infrastructure equipment is able in the geographical region to transmit the one or more of the spot beams within one or more frequency bands that are not used for terrestrial communications, the changing the utilisation state of the each of the one or more of the spot beams from the first utilisation state to the second utilisation state comprises exchanging signalling information with at least one communications device using at least one of the one or more of the spot beams.

In some arrangements of embodiments of the present technique here, all NTN cells within all TAs covering the said country will then turn on the cell-barring bit in the system information (SI) that is broadcast to all NTN capable UEs. That way, when a UE initiates initial access procedure and reads the SI, it would detect the cell-bar and not lock unto the cell. In other words, the signalling information comprises an access barring indication, transmitted by the infrastructure equipment to the at least one communications device, indicating that access to the NTN using the one or more spot beams is barred.

For NGSO satellites that move with respect to the surface of the earth, when the satellite starts to overfly the neighboring country where NTN services are again licensed for operation, the network turns off the cell-barring bit in the SI of the associated cells. More broadly, the network may change back the utilisation state of the one or more spot beams by, for example, transmitting signalling information to the communications device or turning on beams that had been turned off. In other words, the infrastructure equipment is configured to determine, for at least one of the one or more of the spot beams, that the coverage region formed by the one or more of the spot beams is no longer at least partially located within the geographical region in which NTN services are not permitted, and changing the utilisation state of the at least one of the one or more of the spot beams from the second utilisation state to the first utilisation state.

In NTN, it may be necessary for positioning-capable UEs to regularly send periodic location reports to the network. Thus, in some embodiments of the present technique, the network shall determine from the UE location reports that the UE is located in said country by either determining that the location of the UE is within the coverage area of a particular spot beam (e.g. for GEO satellites) or by matching the UE's location to the stored database of vertices of latitude and longitudes marking the boundaries of countries with no NTN licensees and refuses the UE service. In other words, the signalling information comprises location information received by the infrastructure equipment from the at least one communications device, and wherein the infrastructure equipment is configured to determine, based on the location information, a geographical location of the at least one communications device, and to determine that the geographical location of the at least one communications device is within the geographical region in which NTN services are not permitted. Here, this location information may be received from the at least one communications device within periodic location reports transmitted by the at least one communications device to the infrastructure equipment, or alternatively/additionally, as is described in further detail below this location information may be received from the at least one communications device within an uplink message of one of an initial access procedure and a random access procedure performed by the at least one communications device with the infrastructure equipment.

Here, when a UE sends its location to an infrastructure equipment and receives signalling information in return, it may determine either directly from the signalling information or indirectly from the signalling information (i.e. based on a received portion of the database and its own, known location) that it is in a region or country in which NTN services are not permitted. The UE may then be able to decide not to request service, and is able to reduce power by reducing its monitoring for further signals. In other words, in response to determining that access to the NTN using one or more of the spot beams is not permitted, the communications device may be configured to enter a power saving state in which the communications device does not attempt to receive further signalling information from the infrastructure equipment.

In terrestrial networks, a UE can access a network based on its subscription to a Public Land Mobile Network (PLMN). In some arrangements of embodiments of the present technique, if, for example, a UE ends up in a country where its home PLMN has no roaming agreement with respect to the UE's current location, or even has no roaming agreement with a different part (where the UE is currently located) of the same country where national roaming agreement does not exist, UE access may be denied by the core network using Non-Access Stratum (NAS) signalling received directly by the communications device from the core network (CN) or mobility management entity (MME) of the wireless communications network.

The same mechanism can be applied for NTN as well; i.e. a UE is rejected based on NAS signalling for accessing a forbidden TA or PLMN, or for crossing the country border. However, considering an example of a national border of 7000 km and where exact mapping of coordinates needs to be maintained across the whole length of this border, a core network-based solution such as the above described NAS signalling will increase the complexity of CN functions as it may be necessary to maintain the geo-political data of the whole of the Earth, which is not always stable. Therefore, separate functions may maintain the geo-political database and verify the UE's location. Due to this, RAN based or Evolved Serving Mobile Location Centre (E-SMLC, a logical entity within the network) based authorisation checks can also be performed with the benefit of reduced signalling compared to core network-based solution (NAS Registration reject versus Access Stratum (AS) RRC Reject). So, in some embodiments of the present technique, a gNB in NTN has access to each of the UE's location and to the geo-political database and to the PLMN list. The UE may perform initial access (or indeed random access) and send a msg3 or msg5 message with location information that is verified in the gNB. If access is not permitted, then an RRC Reject message is sent and service is refused. In other words, the signalling information comprises an access rejection message transmitted by the infrastructure equipment to the at least one communications device in response to the one of the initial access procedure and the random access procedure, the access rejection message indicating that access by the at least one communications device to the NTN using the one or more spot beams is not permitted.

There may be a security risk that a malicious gNB may get access to the UE's location and reject the service, which makes it possible to create a denial of service cyber attack in politically sensitive areas across national borders. So, the signalling in the above-described embodiment may take place after the security has been activated between the gNB and the UE. If the E-SMLC maintains the database, then it may inform either the CN or the RAN, and the respective solutions described above may be used.

In some arrangements of embodiments of the present technique, when the network detects, as described in detail above, that the satellite is overflying a country in which NTN services are not licensed for operation, the network may encrypt all downlink signals with non-standard keys/methods making UEs located within the said national boundaries unable to decode the signals when they initiate execution of attachment procedures. The principal signal to so encrypt is system information, which is encrypted with keys unknown to the UEs. Dedicated transmissions are encrypted anyway with UE specific keys, and the UE's location is known, so no additional actions are required for Connected mode UE transmissions. In other words, the infrastructure equipment is configured to encrypt each of one or more downlink signals transmitted as part of the signalling information using one or more keys which are not known to the at least one communications device. In this embodiment, System information in NTN is always encrypted, and keys are stored in UE Universal Subscriber Identity Module (USIM) or similar storage; this may involve all system information blocks (SIBs) or just some of them such as the MIB, or a few important parameters like PLMN ID, Tracking Area Identity (TAI), earth zone or sidelink/vehicle-to-everything (V2X) zone ID in the SIBs. Only positioning related system information is encrypted in terrestrial systems, and NTN may follow the same principle. So, the validity of encrypted positioning SIBs is linked to the previously known UE location. The location may be determined in the E-SMLC, the gNB or in the UE itself. If the UE's known location falls outside the allowed territory/territories, then decryption keys become invalid.

Passive Solutions

In some arrangements of embodiments of the present technique, when the network detects, as described in detail above, that the satellite is overflying a country in which NTN services are not licensed for operation, the network causes any satellite beams and/or cells illuminating the country to be switched off. All UEs within the boundaries of the country will not be able to detect a network during any network search when they initiate execution of attachment procedures. In other words, if the infrastructure equipment is able in the geographical region to transmit the one or more of the spot beams within only frequency bands that are used for terrestrial communications, the changing the utilisation state of the each of the one or more of the spot beams from the first utilisation state to the second utilisation state comprises switching off the each of the one or more of the spot beams.

Such passive solutions require that in the design of cells, beams and tracking areas, the geographical boundaries of countries should be taken into account. This requires active satellite beamforming to focus beams accordingly by adapting the illumination as accurately as possible to boundary contours as the satellite over flies regions of the earth where, from the database, the network knows that there exist territories in which NTN services are not licensed. Some of this beam adjustment may be done to beams that remain switched on as they are pointed at neighbouring territories where NTN services are licensed. These beams are adjusted to ensure coverage of any regions in the licensee countries that were previously covered by the switched off beams. In other words, the changing the utilisation state of the each of the one or more of the spot beams from the first utilisation state to the second utilisation state comprises adjusting a pointing angle with respect to surface of the Earth of the each of the one or more of the spot beams such that the coverage region provided by the each of the one or more of the spot beams is increased to cover areas deprived of coverage by any switched off beams whilst ensuring that the new foot-print is not at least partially located within the geographical region in which NTN services are not permitted. In other words, the infrastructure equipment is configured to identify one or more other spot beams to the one or more of the spot beams that are switched off, wherein the one or more other spot beams each provide a coverage region that is fully located within a geographical region in which NTN services are permitted, and wherein the coverage region provided by each of one or more other spot beams is adjacent to a coverage region provided by one of the one or more spot beams that are switched off, the coverage region provided by the one or more spot beams that are switched off being at least partially located within the geographical region in which NTN services are permitted, and to perform a beam adjustment procedure on the one or more other spot beams to change the coverage region provided by the each of the one or more other spot beams, such that the coverage region provided by the each of the one or more other spot beams covers the portion of the geographical region in which NTN services are permitted to which coverage was originally provided by at least one of the spot beams that are switched off.

In arrangements of embodiments of the present technique, for NGSO satellite-based NTNs, when the satellite re-enters the airspace of a territory in which NTN services are licensed for operation, again determined using the database, the satellite may turn its beams back on. The NTN network operations, administration and management (OA&M) system should incorporate the means to intermittently switch particular satellite beams off.

In arrangements of embodiments of the present technique, for NGSO satellites with beam steering capabilities which are required to maintaining earth-fixed cells, when the network detects that the satellite is overflying a country in which NTN services are not licensed for operation, the network causes the satellite to steer (or direct) its beams to illuminate neighboring countries or territories where NTN services are licensed for operation instead. In other words, the infrastructure equipment is configured to identify one or more spot beams, each providing a coverage region that is at least partially located within the geographical region in which NTN services are not permitted, and wherein the coverage region provided by each of one or more spot beams is adjacent to a coverage regions provided by one or more other spot beams, the coverage regions provided by the one or more other spot beams that are fully located within a neighbouring geographical region in which NTN services are permitted, and to perform a beam adjustment procedure on the one or more spot beams to change the coverage region provided by the each of the one or more spot beams, such that the coverage region provided by the each of the one or more spot beams coincides wholly with a portion of the neighbouring geographical region in which NTN services are permitted currently covered by the one or more other spot beams. This has the added benefit of improving coverage and capacity for NTN services in the neighboring region/territory in which NTN services are permitted for the time that the satellite beams illuminate the said neighbouring regions.

NTN-capable UEs are meant to sense their global locations at regular intervals for example based on GPS or other GNSS positioning systems. In arrangements of embodiments of the present technique, when a UE that holds either a full or regional copy of the database of vertices of latitude and longitudes marking the boundaries of countries with no NTN licensees senses its own position and determines from the database that it is within a region for which NTN services are not permitted, the UE refrains from requesting NTN services. In other words, the communications device is configured to receive, from the infrastructure equipment, signalling information providing an indication of at least a portion of a database, the database comprising a list providing an indication of geographical regions in which NTN services are not permitted. The communications device may then be configured to determine, based on the database in combination with a geographical location of the communications device, that the communications device is currently located within a geographical region in which NTN services are not permitted, and to cease transmissions comprising requests for NTN services until the communications device has left the geographical region in which NTN services are not permitted.

It should also be appreciated by those skilled in the art that such passive solutions as described herein may also be utilised instead of active solutions as described herein when the NTN satellite is overflying a territory in which active solutions can be used. In other words, if the infrastructure equipment is able in the geographical region to transmit the one or more of the spot beams within one or more frequency bands that are not used for terrestrial communications, the changing the utilisation state of the each of the one or more of the spot beams from the first utilisation state to the second utilisation state may comprise switching off the each of the one or more of the spot beams.

Flow Chart Representation

Figure 7:
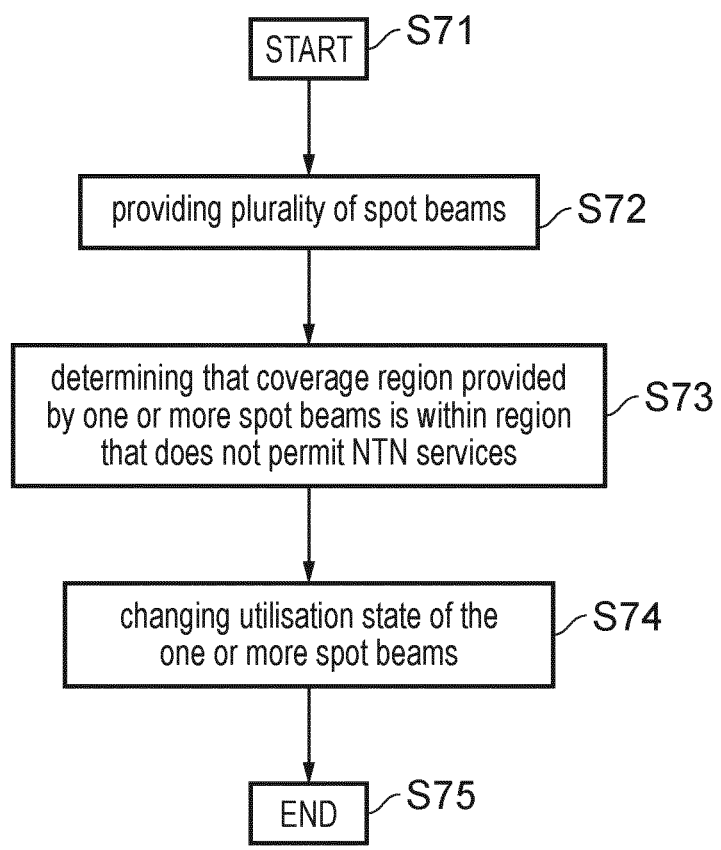
FIG. 7 is a flow diagram representation of a method of operating an infrastructure equipment according to embodiments of the present technique.

FIG. 7 shows a flow diagram illustrating a method of operating an infrastructure equipment forming part of a non-terrestrial network, NTN, of a wireless communications network according to embodiments of the present technique.

The method begins in step S71. The method comprises, in step S72, providing a plurality of spot beams, each of the spot beams providing a wireless access interface for transmitting signals to and/or receiving signals from communications devices within a coverage region formed by the each of the spot beams. In step S73, the method comprises determining, for one or more of the spot beams, that the coverage region formed by the one or more of the spot beams is at least partially located within a geographical region in which NTN services are not permitted. The process then comprises, in step S74, changing a utilisation state of each of the one or more of the spot beams from a first utilisation state to a second utilisation state. The process ends in step S75.

Those skilled in the art would appreciate that the method shown by FIG. 7 may be adapted in accordance with embodiments of the present technique. For example, other intermediate steps may be included in the method, or the steps may be performed in any logical order. Furthermore, though embodiments of the present technique have been described largely by way of the example communications system shown in FIG. 6, it would be clear to those skilled in the art that they could be equally applied to other systems to those described herein.

Those skilled in the art would further appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present disclosure.

The following numbered paragraphs provide further example aspects and features of the present technique:

Paragraph 1. A method of operating an infrastructure equipment forming part of a non-terrestrial network, NTN, of a wireless communications network, the method comprising providing a plurality of spot beams, each of the spot beams providing a wireless access interface for transmitting signals to and/or receiving signals from communications devices within a coverage region formed by the each of the spot beams, determining, for one or more of the spot beams, that the coverage region formed by the one or more of the spot beams is at least partially located within a geographical region in which NTN services are not permitted, and changing a utilisation state of each of the one or more of the spot beams from a first utilisation state to a second utilisation state.

Paragraph 2. A method according to Paragraph 1, the method comprising identifying a plurality of tracking areas located on the surface of the Earth, each of the tracking areas comprising one or more coverage regions each formed by one of the plurality of spot beams, determining that one or more of the tracking areas is at least partially located within the geographical region in which NTN services are not permitted, and changing a utilisation state of each of one or more of the spot beams that form a coverage area comprised within the one or more of the tracking areas from a first utilisation state to a second utilisation state.

Paragraph 3. A method according to Paragraph 1 or Paragraph 2, wherein, if the infrastructure equipment is configured to transmit the one or more of the spot beams within one or more frequency bands that are not used for terrestrial communications, the changing the utilisation state of the each of the one or more of the spot beams from the first utilisation state to the second utilisation state comprises
    exchanging signalling information with at least one communications device using at least one of the one or more of the spot beams Paragraph 4. A method according to Paragraph 3, wherein the signalling information comprises an access barring indication, transmitted by the infrastructure equipment to the at least one communications device, indicating that access to the NTN using the one or more spot beams is barred.

Paragraph 5. A method according to Paragraph 3 or Paragraph 4, wherein the signalling information comprises location information received by the infrastructure equipment from the at least one communications device, and wherein the method comprises
    determining, based on the location information, a geographical location of the at least one communications device, and
    determining that the geographical location of the at least one communications device is within the geographical region in which NTN services are not permitted.

Paragraph 6. A method according to Paragraph 5, wherein the location information is received from the at least one communications device within periodic location reports transmitted by the at least one communications device to the infrastructure equipment.

Paragraph 7. A method according to Paragraph 5 or Paragraph 6, wherein the location information is received from the at least one communications device within an uplink message of one of an initial access procedure and a random access procedure performed by the at least one communications device with the infrastructure equipment.

Paragraph 8. A method according to Paragraph 7, wherein the signalling information comprises an access rejection message transmitted by the infrastructure equipment to the at least one communications device in response to the one of the initial access procedure and the random access procedure, the access rejection message indicating that access by the at least one communications device to the NTN using the one or more spot beams is not permitted.

Paragraph 9. A method according to any of Paragraphs 3 to 8, the method comprising encrypting each of one or more downlink signals transmitted as part of the signalling information using one or more keys which are not known to the at least one communications device.

Paragraph 10. A method according to any of Paragraphs 1 to 9, wherein, if the infrastructure equipment is configured to transmit the one or more of the spot beams within frequency bands that are used for terrestrial communications, the changing the utilisation state of the each of the one or more of the spot beams from the first utilisation state to the second utilisation state comprises
    switching off the each of the one or more of the spot beams.

Paragraph 11. A method according to Paragraph 10, the method comprises
    identifying one or more other spot beams to the one or more of the spot beams that are switched off, wherein the one or more other spot beams each provide a coverage region that is fully located within a geographical region in which NTN services are permitted, and wherein the coverage region provided by each of one or more other spot beams is adjacent to a coverage region provided by one of the one or more spot beams that are switched off, the coverage region provided by the one or more spot beams that are switched off being at least partially located within the geographical region in which NTN services are permitted, and
    performing a beam adjustment procedure on the one or more other spot beams to change the coverage region provided by the each of the one or more other spot beams, such that the coverage region provided by the each of the one or more other spot beams covers the portion of the geographical region in which NTN services are permitted in which the coverage region provided by at least one of the spot beams that are switched off is located.

Paragraph 12. A method according to any of Paragraphs 1 to 11, wherein, if the infrastructure equipment is configured to transmit the one or more of the spot beams within frequency bands that are used for terrestrial communications, the changing the utilisation state of the each of the one or more of the spot beams from the first utilisation state to the second utilisation state comprises
    adjusting an angle with respect to surface of the Earth of the each of the one or more of the spot beams such that the coverage region provided by the each of the one or more of the spot beams is no longer at least partially located within the geographical region in which NTN services are not permitted.

Paragraph 13. A method according to any of Paragraphs 1 to 12, wherein the coverage area formed by each of the plurality of spot beams varies over time in accordance with a motion of the infrastructure equipment with respect to the surface of the Earth.

Paragraph 14. A method according to Paragraph 13, the method comprising
    determining, for at least one of the one or more of the spot beams, that the coverage region formed by the one or more of the spot beams is no longer at least partially located within the geographical region in which NTN services are not permitted, and
    changing the utilisation state of the at least one of the one or more of the spot beams from the second utilisation state to the first utilisation state.

Paragraph 15. A method according to Paragraph 13 or Paragraph 14, the method comprising
    accessing a database stored by the wireless communications network, the database comprising a list providing an indication of geographical regions in which NTN services are not permitted.

Paragraph 16. A method according to Paragraph 15, the method comprising
    transmitting, to at least one communications device, signalling information providing an indication of at least a portion of the database.

Paragraph 17. A method according to any of Paragraphs 1 to 16, wherein a trajectory of the infrastructure equipment is such that the coverage area formed by each of the plurality of spot beams is substantially constant with respect to the surface of the Earth.

Paragraph 18. A method according to any of Paragraphs 1 to 17, wherein the infrastructure equipment is one of a satellite, an airborne vehicle or an airborne platform.

Paragraph 19. A method according to any of Paragraphs 1 to 18, wherein one or more of the communications devices are user equipment.

Paragraph 20. A method according to any of Paragraphs 1 to 19, wherein one or more of the communications devices are each acting as a relay node for one or more user equipment, each of the one or more user equipment being in one of an RRC connected mode, an RRC idle state or an RRC inactive state.

Paragraph 21. An infrastructure equipment forming part of a non-terrestrial network, NTN, of a wireless communications network, the infrastructure equipment comprising
one or more transceivers configured to transmit signals and receive signals, and
a controller configured in combination with the one or more transceivers
to provide a plurality of spot beams, each of the spot beams providing a wireless access interface for transmitting signals to and/or receiving signals from communications devices within a coverage region formed by the each of the spot beams,
to determine, for one or more of the spot beams, that the coverage region formed by the one or more of the spot beams is at least partially located within a geographical region in which NTN services are not permitted, and
to change a utilisation state of each of the one or more of the spot beams from a first utilisation state to a second utilisation state.

Paragraph 22. Circuitry for an infrastructure equipment forming part of a non-terrestrial network, NTN, of a wireless communications network, the circuitry comprising
transceiver circuitry configured to transmit signals and receive signals, and
controller circuitry configured in combination with the transceiver circuitry
to provide a plurality of spot beams, each of the spot beams providing a wireless access interface for transmitting signals to and/or receiving signals from communications devices within a coverage region formed by the each of the spot beams,
to determine, for one or more of the spot beams, that the coverage region formed by the one or more of the spot beams is at least partially located within a geographical region in which NTN services are not permitted, and
to change a utilisation state of each of the one or more of the spot beams from a first utilisation state to a second utilisation state.

Paragraph 23. A method of operating a communications device configured to transmit signals to and to receive signals from an infrastructure equipment forming part of a non-terrestrial network, NTN, of a wireless communications network, the method comprising
communicating with the infrastructure equipment via one of a plurality of spot beams, each of the spot beams providing a wireless access interface for transmitting signals to and/or receiving signals from the infrastructure equipment within a coverage region formed by the each of the spot beams,
receiving signalling information from the wireless communications network, and
determining, based on the signalling information, that access to the NTN using one or more of the spot beams is not permitted.

Paragraph 24. A method according to Paragraph 23, wherein the signalling information is received by the communications device from the infrastructure equipment via the one of the plurality of spot beams, and wherein the signalling information comprises an access barring indication indicating that access to the NTN using the one or more spot beams is barred.

Paragraph 25. A method according to Paragraph 23 or Paragraph 24, the method comprising
transmitting location information to the infrastructure equipment, the location information indicating a geographical location of the communications device,
wherein the signalling information is received by the communications device from the infrastructure equipment via the one of the plurality of spot beams, and wherein the signalling information is dependent on the location information.

Paragraph 26. A method according to Paragraph 25, wherein the location information is transmitted to the infrastructure equipment within periodic location reports transmitted by the communications device to the infrastructure equipment.

Paragraph 27. A method according to Paragraph 25 or Paragraph 26, wherein the location information is transmitted to the infrastructure equipment by the communications device within an uplink message of one of an initial access procedure and a random access procedure performed by the communications device with the infrastructure equipment.

Paragraph 28. A method according to Paragraph 27, wherein the signalling information comprises an access rejection message received from the infrastructure equipment, the access rejection message indicating that access by the communications device to the NTN using the one or more spot beams is not permitted.

Paragraph 29. A method according to any of Paragraphs 23 to 28, wherein the signalling information is received by the communications device from the infrastructure equipment via the one of the plurality of spot beams, and wherein the method comprises
determining that one or more downlink signals transmitted as part of the signalling information have been encrypted by the wireless communications network using one or more keys which are not known to the at least one communications device.

Paragraph 30. A method according to any of Paragraphs 23 to 29, wherein the signalling information is received by the communications device from the wireless communications network via Non-Access Stratum, NAS, signalling.

Paragraph 31. A method according to any of Paragraphs 23 to 30, the method comprising, in response to determining that access to the NTN using one or more of the spot beams is not permitted,
entering a power saving state in which the communications device does not attempt to receive further signalling information from the infrastructure equipment.

Paragraph 32. A method according to any of Paragraphs 23 to 31, the method comprising
receiving, from the infrastructure equipment, signalling information providing an indication of at least a portion of a database, the database comprising a list providing an indication of geographical regions in which NTN services are not permitted.

Paragraph 33. A method according to Paragraph 32, the method comprising
determining, based on the database in combination with a geographical location of the communications device, that the communications device is currently located within a geographical region in which NTN services are not permitted, and
ceasing transmissions comprising requests for NTN services until the communications device has left the geographical region in which NTN services are not permitted.

Paragraph 34. A communications device comprising
a transceiver configured to transmit signals to and to receive signals from an infrastructure equipment forming part of a non-terrestrial network, NTN, of a wireless communications network, and a controller configured in combination with the transceiver to communicate with the infrastructure equipment via one of a plurality of spot beams, each of the spot beams providing a wireless access interface for transmitting signals to and/or receiving signals from the infrastructure equipment within a coverage region formed by the each of the spot beams, to receive signalling information from the wireless communications network, and to determine, based on the signalling information, that access to the NTN using one or more of the spot beams is not permitted.

Paragraph 35. Circuitry for a communications device, the circuitry comprising transceiver circuitry configured to transmit signals to and to receive signals from an infrastructure equipment forming part of a non-terrestrial network, NTN, of a wireless communications network, and controller circuitry configured in combination with the transceiver circuitry to communicate with the infrastructure equipment via one of a plurality of spot beams, each of the spot beams providing a wireless access interface for transmitting signals to and/or receiving signals from the infrastructure equipment within a coverage region formed by the each of the spot beams, to receive signalling information from the wireless communications network, and to determine, based on the signalling information, that access to the NTN using one or more of the spot beams is not permitted.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

[1] TR 38.811, "Study on New Radio (NR) to support non terrestrial networks (Release 15)", 3rd Generation Partnership Project, December 2017.
[2] Holma H. and Toskala A, "LTE for UMTS OFDMA and SC-FDMA based radio access", John Wiley and Sons, 2009.
[3] RP-172834, "Revised WID on New Radio Access Technology," NTT DOCOMO, RAN #78.
[4] TR 38.913, "Study on Scenarios and Requirements for Next Generation Access Technologies (Release 14)", 3rd Generation Partnership Project.

What is claimed is:

1. A method of operating an infrastructure equipment forming part of a non-terrestrial network (NTN) of a wireless communications network, the method comprising:
providing a plurality of spot beams, each of the spot beams providing a wireless access interface for transmitting signals to and/or receiving signals from communications devices within a coverage region formed by the each of the spot beams;
determining, for one or more of the spot beams, that the coverage region formed by the one or more of the spot beams is at least partially located within a geographical region in which NTN services are not permitted, and
changing a utilization state of each of the one or more of the spot beams from a first utilization state to a second utilization state.

2. The method of claim 1, the method comprising:
identifying a plurality of tracking areas located on the surface of the Earth, each of the tracking areas comprising one or more coverage regions each formed by one of the plurality of spot beams;
determining that one or more of the tracking areas is at least partially located within the geographical region in which NTN services are not permitted; and
changing a utilization state of each of one or more of the spot beams that form a coverage area comprised within the one or more of the tracking areas from a first utilization state to a second utilization state.

3. The method of claim 1, wherein, if the infrastructure equipment is configured to transmit the one or more of the spot beams within one or more frequency bands that are not used for terrestrial communications, the changing the utilization state of the each of the one or more of the spot beams from the first utilization state to the second utilization state comprises:
exchanging signalling information with at least one communications device using at least one of the one or more of the spot beams.

4. The method of claim 3, wherein the signalling information comprises an access barring indication, transmitted by the infrastructure equipment to the at least one communications device, indicating that access to the NTN using the one or more spot beams is barred.

5. The method of claim 3, wherein the signalling information comprises location information received by the infrastructure equipment from the at least one communications device, and wherein the method comprises:
determining, based on the location information, a geographical location of the at least one communications device; and
determining that the geographical location of the at least one communications device is within the geographical region in which NTN services are not permitted.

6. The method of claim 5, wherein the location information is received from the at least one communications device within periodic location reports transmitted by the at least one communications device to the infrastructure equipment.

7. The method of claim 5, wherein the location information is received from the at least one communications device within an uplink message of one of an initial access procedure and a random access procedure performed by the at least one communications device with the infrastructure equipment.

8. The method of claim 7, wherein the signalling information comprises an access rejection message transmitted by the infrastructure equipment to the at least one communications device in response to the one of the initial access procedure and the random access procedure, the access rejection message indicating that access by the at least one communications device to the NTN using the one or more spot beams is not permitted.

9. The method of claim 3, the method comprising:
encrypting each of one or more downlink signals transmitted as part of the signalling information using one or more keys which are not known to the at least one communications device.

10. The method of claim 1, wherein, if the infrastructure equipment is configured to transmit the one or more of the spot beams within frequency bands that are used for terrestrial communications, the changing the utilization state of the each of the one or more of the spot beams from the first utilization state to the second utilization state comprises;
switching off the each of the one or more of the spot beams.

11. The method of claim 10, the method comprises:
identifying one or more other spot beams to the one or more of the spot beams that are switched off, wherein the one or more other spot beams each provide a coverage region that is fully located within a geographical region in which NTN services are permitted, and wherein the coverage region provided by each of one or more other spot beams is adjacent to a coverage region provided by one of the one or more spot beams that are switched off, the coverage region provided by the one or more spot beams that are switched off being at least partially located within the geographical region in which NTN services are permitted; and
performing a beam adjustment procedure on the one or more other spot beams to change the coverage region provided by the each of the one or more other spot beams, such that the coverage region provided by the each of the one or more other spot beams covers the portion of the geographical region in which NTN services are permitted in which the coverage region provided by at least one of the spot beams that are switched off is located.

12. The method of claim 1, wherein, if the infrastructure equipment is configured to transmit the one or more of the spot beams within frequency bands that are used for terrestrial communications, the changing the utilization state of the each of the one or more of the spot beams from the first utilization state to the second utilization state comprises:
adjusting an angle with respect to surface of the Earth of the each of the one or more of the spot beams such that the coverage region provided by the each of the one or more of the spot beams is no longer at least partially located within the geographical region in which NTN services are not permitted.

13. The method of claim 1, wherein the coverage area formed by each of the plurality of spot beams varies over time in accordance with a motion of the infrastructure equipment with respect to the surface of the Earth.

14. The method of claim 13, the method comprising:
determining, for at least one of the one or more of the spot beams, that the coverage region formed by the one or more of the spot beams is no longer at least partially located within the geographical region in which NTN services are not permitted; and
changing the utilization state of the at least one of the one or more of the spot beams from the second utilization state to the first utilization state.

15. The method of claim 13, the method comprising:
accessing a database stored by the wireless communications network, the database comprising a list providing an indication of geographical regions in which NTN services are not permitted.

16. The method of claim 15, the method comprising:
transmitting, to at least one communications device, signalling information providing an indication of at least a portion of the database.

17. The method of claim 1, wherein a trajectory of the infrastructure equipment is such that the coverage area formed by each of the plurality of spot beams is substantially constant with respect to the surface of the Earth.

18. The method of claim 1, wherein one or more of the communications devices are each acting as a relay node for one or more user equipment, each of the one or more user equipment being in one of an RRC connected mode, an RRC idle state or an RRC inactive state.

19. An infrastructure equipment forming part of a non-terrestrial network (NTN) of a wireless communications network, the infrastructure equipment comprising:
one or more transceivers configured to transmit signals and receive signals; and
a controller configured in combination with the one or more transceivers
to provide a plurality of spot beams, each of the spot beams providing a wireless access interface for transmitting signals to and/or receiving signals from communications devices within a coverage region formed by the each of the spot beams;
to determine, for one or more of the spot beams, that the coverage region formed by the one or more of the spot beams is at least partially located within a geographical region in which NTN services are not permitted; and
to change a utilization state of each of the one or more of the spot beams from a first utilization state to a second utilization state.

20. An infrastructure equipment forming part of a non-terrestrial network (NTN) of a wireless communications network, the infrastructure equipment comprising:
circuitry configured to
provide a plurality of spot beams, each of the spot beams providing a wireless access interface for transmitting signals to and/or receiving signals from communications devices within a coverage region formed by the each of the spot beams;
determine, for one or more of the spot beams, that the coverage region formed by the one or more of the spot beams is at least partially located within a geographical region in which NTN services are not permitted; and
change a utilization state of each of the one or more of the spot beams from a first utilization state to a second utilization state.

* * * * *